Figure 1:
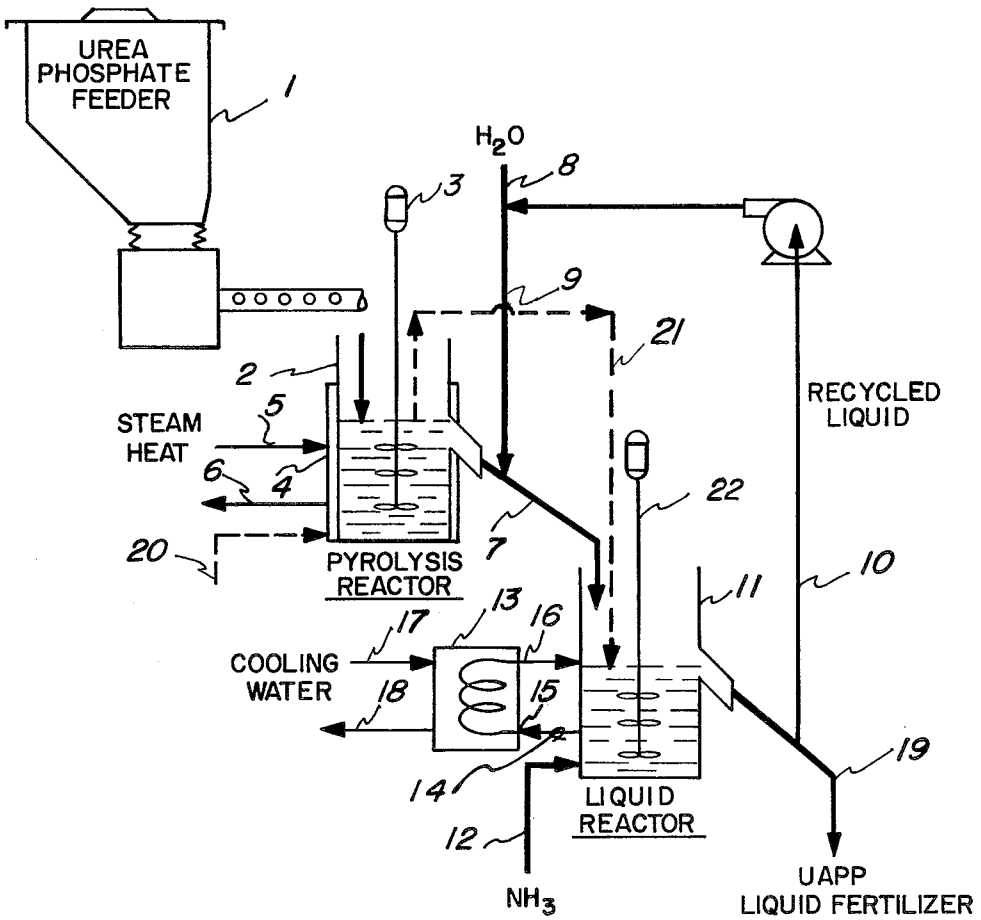
Figure 3:
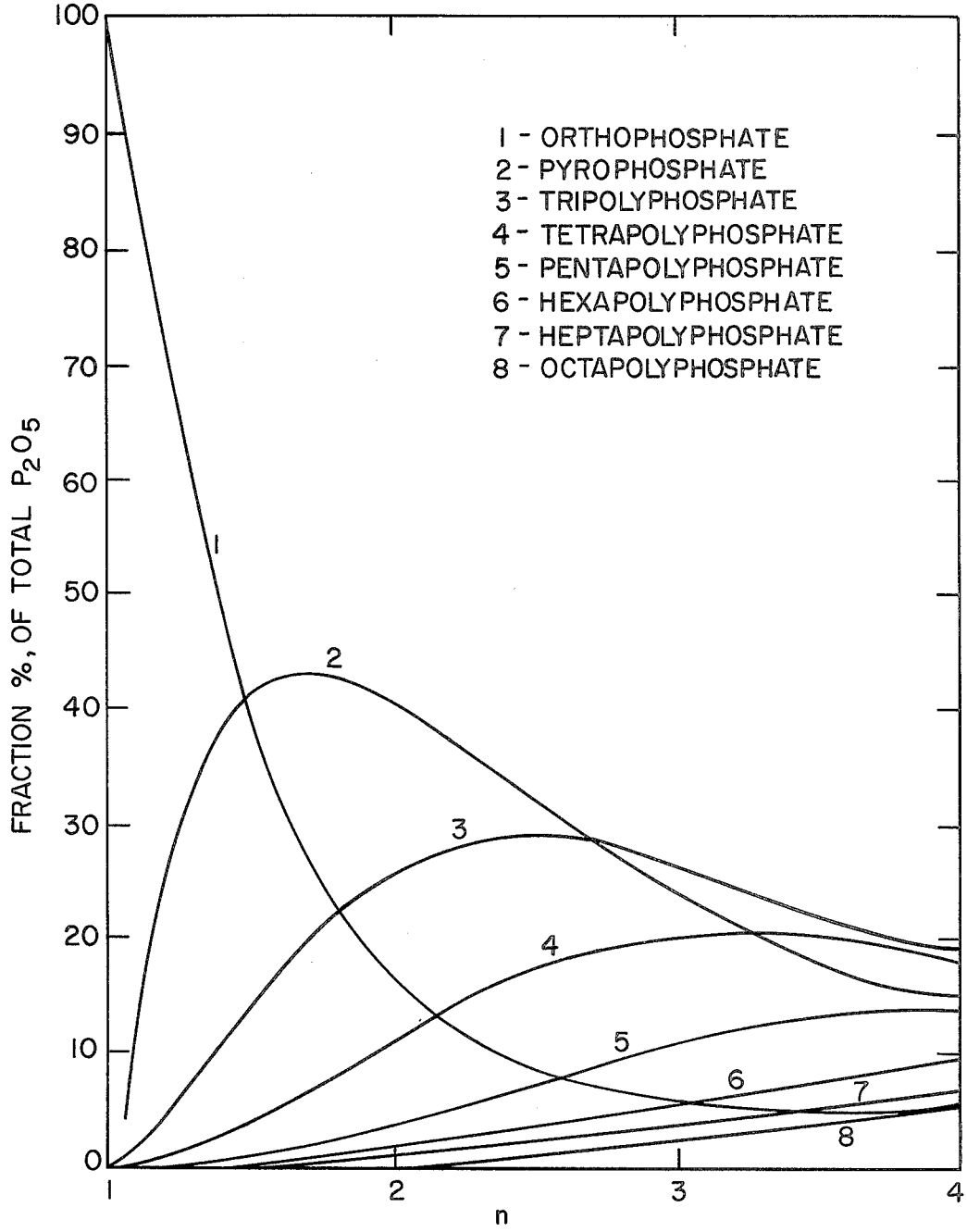
Figure 4:
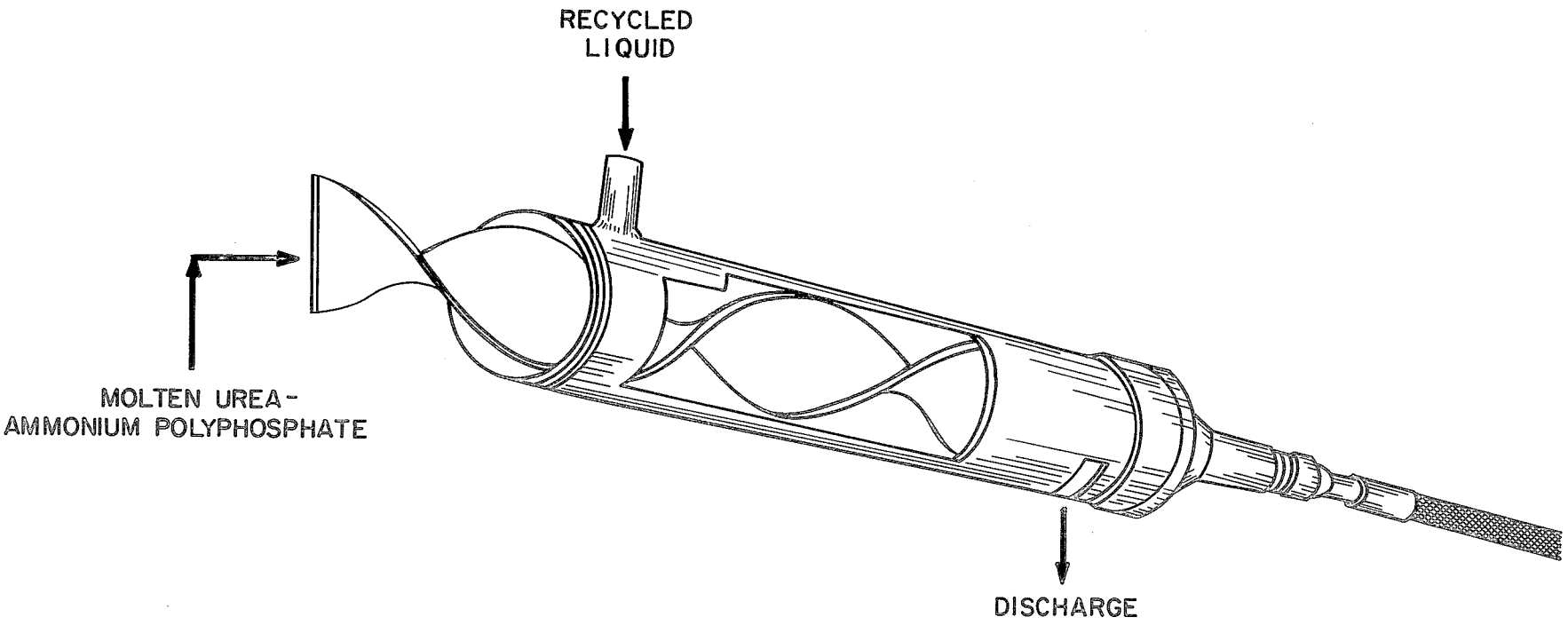
Figure 5:
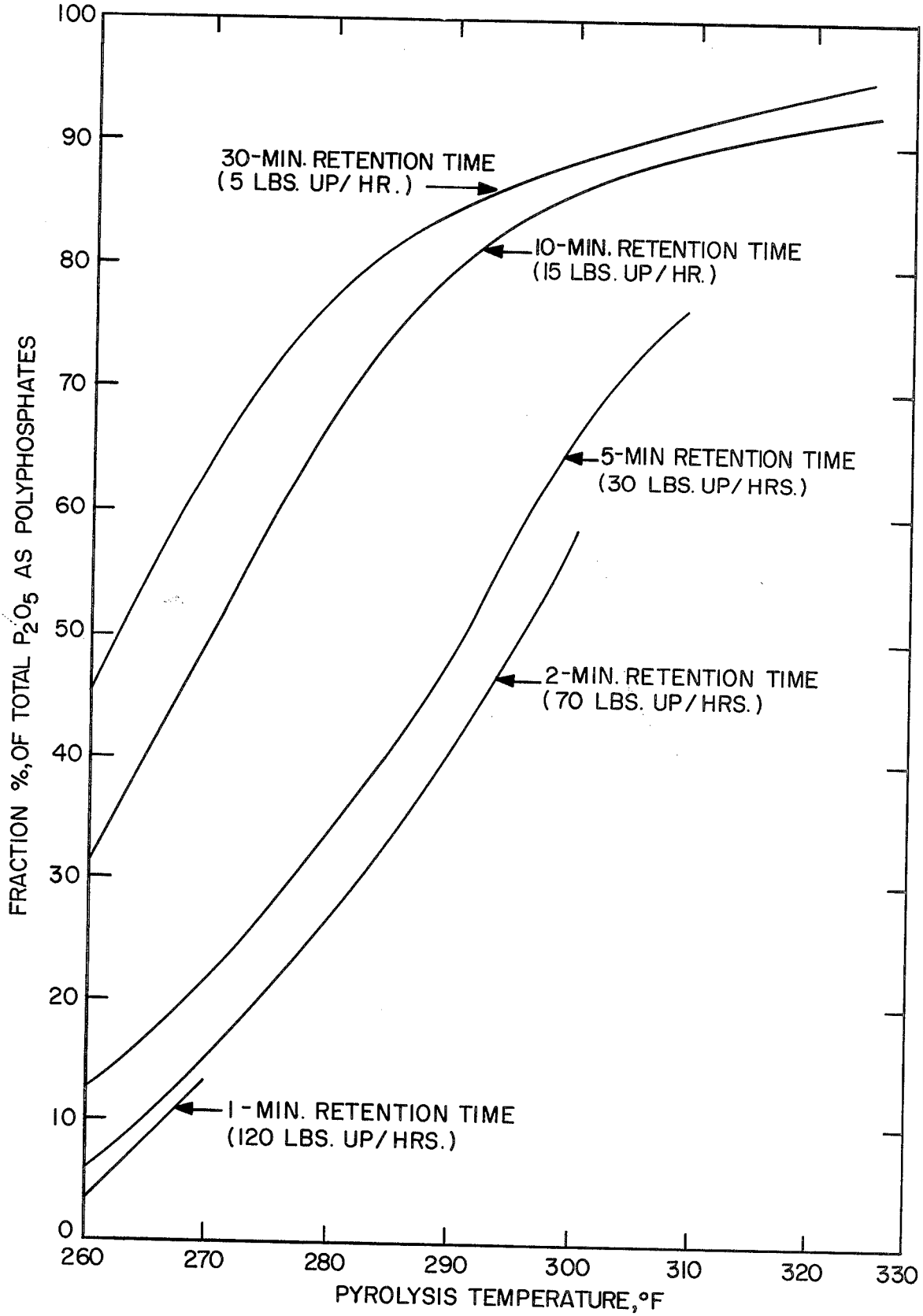
Figure 2:
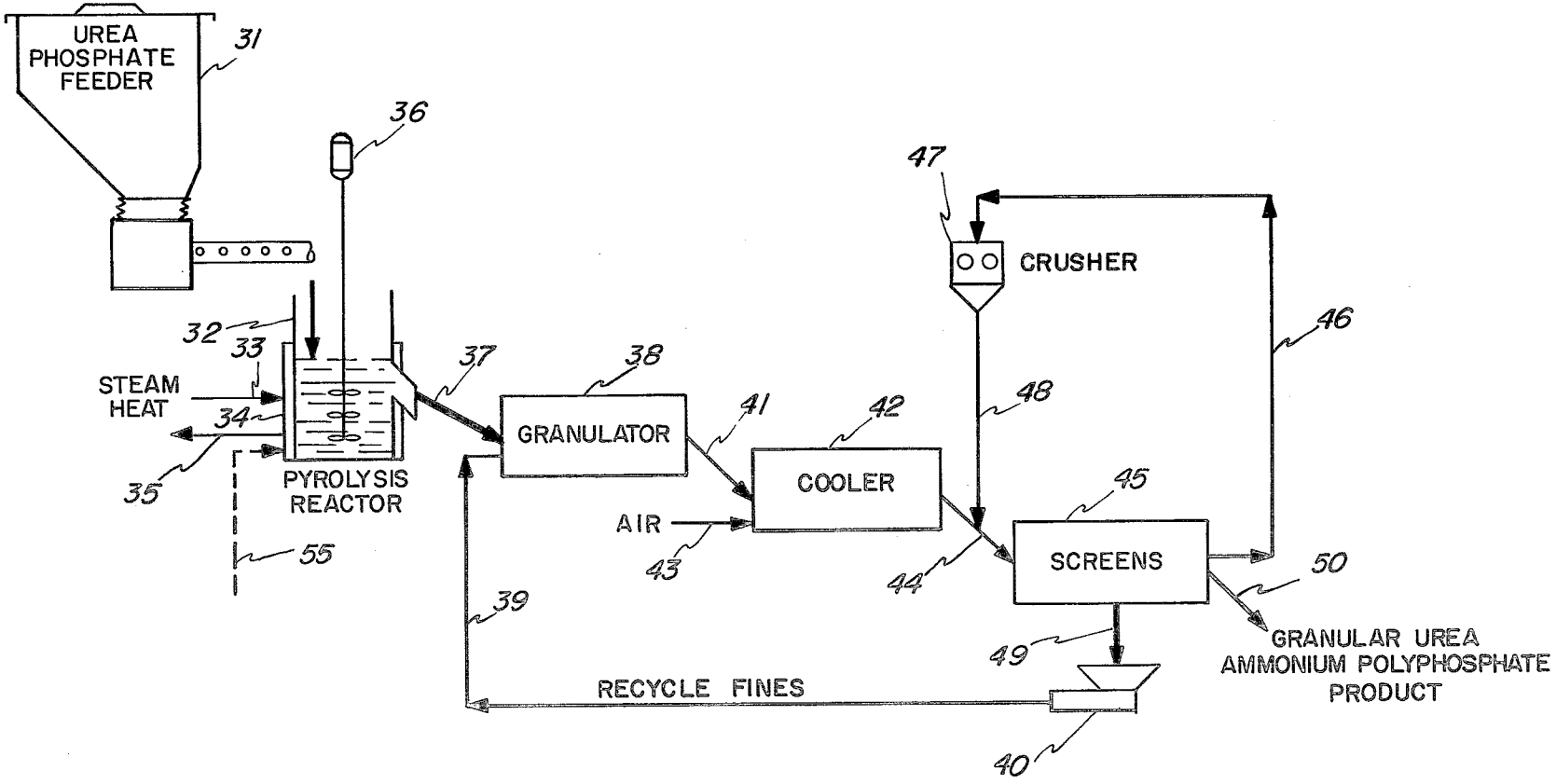

United States Defensive Publication [19] (H) [11] T973,004

Stinson et al. [43] Aug. 1, 1978

[54] PRODUCTION OF UREA-AMMONIUM POLYPHOSPHATES FROM UREA PHOSPHATE

[75] Inventors: John M. Stinson, 1525 Ridge Dr., Sheffield, Ala. 35660; Horace C. Mann, Jr., 1942 Holiday Dr.; John F. McCullough, 2909 Alexander, both of Florence, Ala. 35630

[73] Assignee: Tennessee Valley Authority

[21] Appl. No.: 838,503

[22] Filed: Oct. 3, 1977

[51] Int. Cl.[2] ..... C05C 9/00

[52] U.S. Cl. ..... 71/29; 71/64 C; 71/64 D; 260/555 R

[57] ABSTRACT

A process for the production of high-purity urea-ammonium polyphosphate fertilizers from crystalline urea orthophosphate derived from the reaction of wet-process acid and urea. Initially, urea phosphate was pyrolyzed in one stage to give molten urea-ammonium polyphosphates that contained up to 95 percent of the phosphate as polyphosphate, dependent upon the reaction conditions used. Heat to effect condensation of orthophosphate with urea to form polyphosphate was provided by steam. Reaction conditions ranging from a retention time of 1 minute at 350° F to 30 minutes at 260° F were satisfactory. The pyrolyzate contained mixtures of urea, ammonium orthophosphate, and ammonium polyphosphates and was dissolved in aqua ammonia to yield clear liquid fertilizers containing 12 to 15 percent nitrogen and 18 to 29 percent $P_2O_5$. Addition of either urea to the process to maintain a urea:biuret ratio of at least 16, or about 2 pounds $NH_3$ per unit $P_2O_5$ to the pyrolysis reactor prevented biuret precipitation in the liquid fertilizers. Granulation of urea-ammonium polyphosphate melt by conventional means gave solids containing 19 to 21 percent N and 45 to 47 percent $P_2O_5$. Supplementary, secondary, or micronutrient-containing materials may be incorporated in the liquid or solid products.

3 Claims, 5 Sheets Drawing,

32 Pages Specification

The file of this unexamined application may be inspected and copies thereof may be purchased (849 O.G. 1221, Apr. 9, 1968).

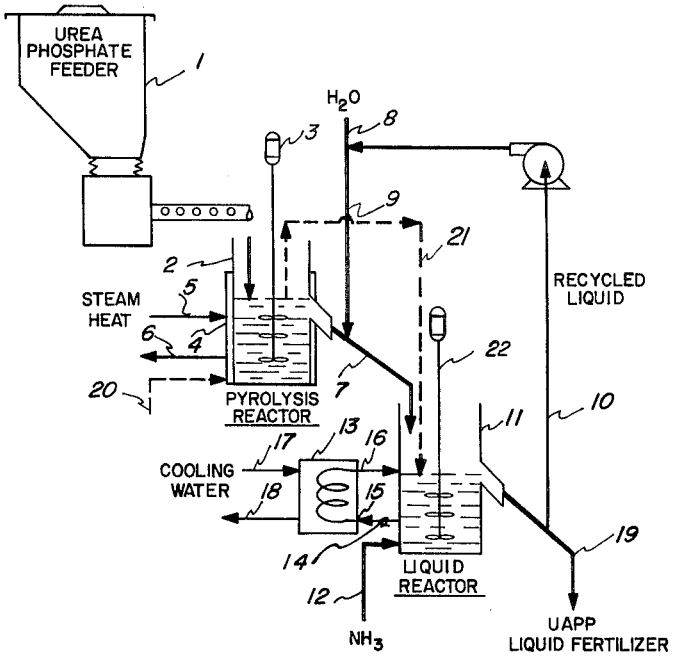

PRODUCTION OF HIGH-PURITY UREA-AMMONIUM POLYPHOSPHATE LIQUID FERTILIZER BY THERMAL DECOMPOSITION OF UREA PHOSPHATE

PRODUCTION OF HIGH-PURITY UREA-AMMONIUM POLYPHOSPHATE LIQUID FERTILIZER BY THERMAL DECOMPOSITION OF UREA PHOSPHATE

DISTRIBUTION OF PHOSPHATE SPECIES IN PYROLYZED UREA PHOSPHATE

UNLOADING DEVICE TO REMOVE MOLTEN UAPP FROM PYROLYSIS REACTOR

EFFECT OF UREA PHOSPHATE PYROLYSIS TEMPERATURE AND RETENTION TIME ON POLYPHOSPHATE LEVEL IN UREA AMMONIUM POLYPHOSPHATE LIQUIDS

PRODUCTION OF GRANULAR HIGH-PURITY UREA-AMMONIUM POLYPHOSPHATE SOLID FERTILIZER BY THERMAL DECOMPOSITION OF UREA PHOSPHATE